(12) United States Patent
Bianco Mengotti (10) Patent No.: US 11,772,789 B2
(45) Date of Patent: Oct. 3, 2023

(54) TAIL SITTER

(71) Applicant: LEONARDO S.P.A., Rome (IT)

(72) Inventor: Riccardo Bianco Mengotti, Samarate (IT)

(73) Assignee: LEONARDO S.P.A., Rome (IT)

( * ) Notice: Subject to any disclaimer, the term of this patent is extended or adjusted under 35 U.S.C. 154(b) by 367 days.

(21) Appl. No.: 16/973,307

(22) PCT Filed: Jun. 28, 2019

(86) PCT No.: PCT/IB2019/055514
§ 371 (c)(1),
(2) Date: Dec. 8, 2020

(87) PCT Pub. No.: WO2020/003239
PCT Pub. Date: Jan. 2, 2020

(65) Prior Publication Data
US 2021/0245875 A1 Aug. 12, 2021

(30) Foreign Application Priority Data
Jun. 28, 2018 (EP) ..................................... 18180581

(51) Int. Cl.
*B64C 29/02* (2006.01)
*B64C 9/00* (2006.01)
(Continued)

(52) U.S. Cl.
CPC ................ *B64C 29/02* (2013.01); *B64C 9/00* (2013.01); *B64C 25/32* (2013.01); *B64C 27/54* (2013.01);
(Continued)

(58) Field of Classification Search
CPC .......... B64C 29/02; B64C 9/00; B64C 25/32; B64C 27/54; B64C 39/024; B64C 39/068;
(Continued)

(56) References Cited

U.S. PATENT DOCUMENTS 3,572,614 A * 3/1971 Bertelsen ................ B64C 39/10
244/12.1
5,114,096 A 5/1992 Wernicke
(Continued)

FOREIGN PATENT DOCUMENTS

| CN | 106938701 | 7/2017 |
|---|---|---|
| EP | 3 243 750 | 11/2017 |

(Continued)

*Primary Examiner* — Rodney A Bonnette
(74) *Attorney, Agent, or Firm* — Leason Ellis LLP (57) ABSTRACT

A tail sitter aircraft includes a wing with a closed front section and a fuselage, from which the wing extends. The wing includes a first portion projecting from the fuselage and a second portion spaced from the first portion. The aircraft includes first and second connecting section that are interposed between the first and second portions. The fuselage extends parallel to a first axis and the first and second portions extend parallel to a second axis orthogonal to the first axis. The first axis is arranged, in use, vertically in a take-off/landing position and inclined with respect to the vertical direction in a cruising position.

13 Claims, 11 Drawing Sheets

(51) Int. Cl.
    *B64C 25/32* (2006.01)
    *B64C 27/54* (2006.01)
    *B64C 39/02* (2023.01)
    *B64C 39/06* (2006.01)
    *B64U 10/00* (2023.01)

(52) U.S. Cl.
    CPC .......... *B64C 39/024* (2013.01); *B64C 39/068* (2013.01); *B64C 2009/005* (2013.01); *B64U 10/00* (2023.01)

(58) Field of Classification Search
CPC .... B64C 2009/005; B64U 10/00; B64U 10/20
See application file for complete search history.

(56) References Cited

U.S. PATENT DOCUMENTS

| | | |
|---|---|---|
| 8,657,226 B1 * | 2/2014 | McGinnis ............ B64C 39/068 244/45 R |
| 9,499,266 B1 * | 11/2016 | Garreau .................... B64C 9/00 |
| 10,800,521 B1 * | 10/2020 | Grenier .................... B64C 29/02 |
| 2016/0311553 A1 | 10/2016 | Alber et al. |
| 2017/0166305 A1 | 6/2017 | Arlton et al. |
| 2017/0297699 A1 | 10/2017 | Alber et al. |
| 2018/0237124 A1 * | 8/2018 | Roberts ................ G05D 1/0808 |
| 2020/0339256 A1 * | 10/2020 | Ivans ........................ B64D 5/00 |
| 2021/0245876 A1 * | 8/2021 | Bianco Mengotti .... B64C 29/02 |
| 2022/0169380 A1 * | 6/2022 | Mehrgan ................ B64C 39/08 |

FOREIGN PATENT DOCUMENTS

| | | |
|---|---|---|
| EP | 3 263 445 | 1/2018 |
| WO | WO 2016/005954 | 1/2016 |
| WO | WO 2016/058502 | 4/2016 |
| WO | WO 2016/209350 | 12/2016 |
| WO | WO 2017/210595 | 12/2017 |

\* cited by examiner

TAIL SITTER

CROSS-REFERENCE TO RELATED APPLICATIONS

This patent application is a U.S. National Phase Application under 35 U.S.C. § 371 of International Patent Application No. PCT/IB2019/055514, filed on Jun. 28, 2019, which claims priority from European patent application no. 18180581.3 filed on Jun. 28, 2018, all of which are incorporated by reference, as if expressly set forth in their respective entireties herein.

TECHNICAL FIELD

The present invention relates to a tail sitter.

BACKGROUND ART

Since the mid twentieth century, there has been awareness in the aeronautics industry of the need for aircrafts capable of a vertical take-off and landing and having sufficiently high cruising speeds to be able to swiftly cover medium/long haul routes.

A partial solution to this need is constituted by helicopters and convertiplanes, which are, however, not without drawbacks.

Helicopters actually have a maximum speed of approximately 350 km/h. Convertiplanes require rotating the nacelles with the rotors between the helicopter configuration and the aeroplane configuration, thereby being particularly complex from the constructional standpoint.

A further solution proposed for satisfying this need is constituted by VTOL (Vertical Take-off Landing) aircrafts.

These have a take-off/landing configuration with the fuselage horizontal and engines capable of orientating the thrust in a vertical direction during take-off/landing or in a horizontal direction during horizontal translational flight.

Despite their widespread use and their efficiency, the constructional configuration of VTOL aircrafts is particularly complex. This derives from the fact that it is necessary to selectively orientate the direction of thrust of the engines according to the aircraft's take-off/landing/flight conditions.

A further solution proposed for meeting the aforementioned need was developed between the forties and sixties of the twentieth century and is constituted by tail sitters.

These aircrafts basically comprise a fuselage, a pair of half-wings, one or more drive members normally carried by the fuselage and a tail fin equipped with movable surfaces to control the aircraft.

The flight profile of a tail sitter contemplates take-off with the fuselage of the aircraft positioned vertically, a first transition phase in which the aircraft rotates ninety degrees to assume a cruising position, and a second transition phase in which the aircraft returns to having the fuselage positioned vertically to perform the landing.

During the take-off and landing phases, the tail sitter rests on the ground by means of wheels, generally carried by the tail fin of the aircraft.

Subsequently, the thrust of the motors counters the weight of the tail sitter in take-off/landing conditions and the aerodynamic resistance of the air in flight conditions.

Prototypes of these solutions are represented by the Lockheed XFV-1, Convair XFY-1 Pogo and Ryan X-13 Vertijet aircraft.

US-2017/0297699, CN-A-106938701, US-A-2017/0166305, WO-A-2016/209350, US-A-2016/0311553 and U.S. Pat. No. 5,114,096 describe known tail sitter solutions.

Tail sitters are particularly advantageous as they have a substantially similar configuration to that of aeroplanes and, therefore, particularly simple to construct when compared with that of convertiplanes and VTOL aircraft.

Furthermore, unlike helicopters, tail sitters do not have particular limits regarding the maximum cruising speed, which is comparable to that of conventional aeroplanes.

Nevertheless, the vertical take-off and landing position of tail sitters imposes geometrical and operational constraints on the shape of the half-wings, especially when the weight of the tail sitter exceeds a certain threshold value. For example, it is necessary to minimize the surface of the half-wing exposed to the wind, so as to minimize sensitivity to gusts of wind during the take-off and landing phases.

In consequence, the performance of tail sitters in the cruising position is penalized by the configuration of these half-wings.

This has substantially prevented the effective use of tail sitters. In fact, most of the previously mentioned prototypes have never lead to actually deployed aircrafts. In consequence, the use of tail sitters has been substantially abandoned over the last fifty years, mainly in favour of VTOL aircraft.

There is awareness in the industry of the need to produce tail sitters having performance in conventional trim comparable to that of traditional aeroplanes.

There is also awareness in the industry of the need to make the take-off and landing operations of tail sitters easier.

Finally, there is awareness in the industry of the need to combine reduced tail sitter size with the aforesaid improved flight performance in conventional trim.

WO-A-2016/005954 discloses a tail-sitter according to the preamble of claim 1.

EP-A-3243750 discloses a distributed propulsion system for a craft that comprises a frame, a plurality of hydraulic or electric motors disposed within or attached to the frame in a distributed configuration; a propeller operably connected to each of the hydraulic or electric motors, a source of hydraulic or electric power disposed within or attached to the frame and coupled to each of the disposed within or attached to the frame, wherein the source of hydraulic or electric power provides sufficient energy density for the craft to attain and maintain operations of the craft, a controller coupled to each of the hydraulic or electric motors, and one or more processors communicably coupled to each controller that control an operation and speed of the plurality of hydraulic or electric motors.

EP-A-3263445 discloses an aircraft includes a flying frame having an airframe, a propulsion system attached to the airframe and a flight control system operably associated with the propulsion system wherein, the flying frame has a vertical takeoff and landing mode and a forward flight mode. A pod assembly is selectively attachable to the flying frame such that the flying frame is rotatable about the pod assembly wherein, the pod assembly remains in a generally horizontal attitude during vertical takeoff and landing, forward flight and transitions therebetween.

WO-A-2016/058502 discloses a tail-sitter aircraft, comprising an aircraft body, an aircraft wing, an attitude control device and a main thrust device using a heat engine as a power device, wherein the aircraft wing comprises a left half wing and a right half wing, the attitude control device comprises a roll attitude adjusting device, a pitch attitude adjusting device and a flight control system.

DISCLOSURE OF INVENTION

The object of the present invention is to provide a tail sitter that enables satisfying at least one of the aforementioned needs in a simple and inexpensive manner.

The aforementioned object is achieved by the present invention, in so far as it relates to a tail sitter according to claim 1.

BRIEF DESCRIPTION OF THE DRAWINGS

For a better understanding of the present invention, two preferred embodiment will be described hereinafter, purely by way of a non-limitative example and with reference to the accompanying drawings, in which.

BEST MODE FOR CARRYING OUT THE INVENTION

Figure 1:
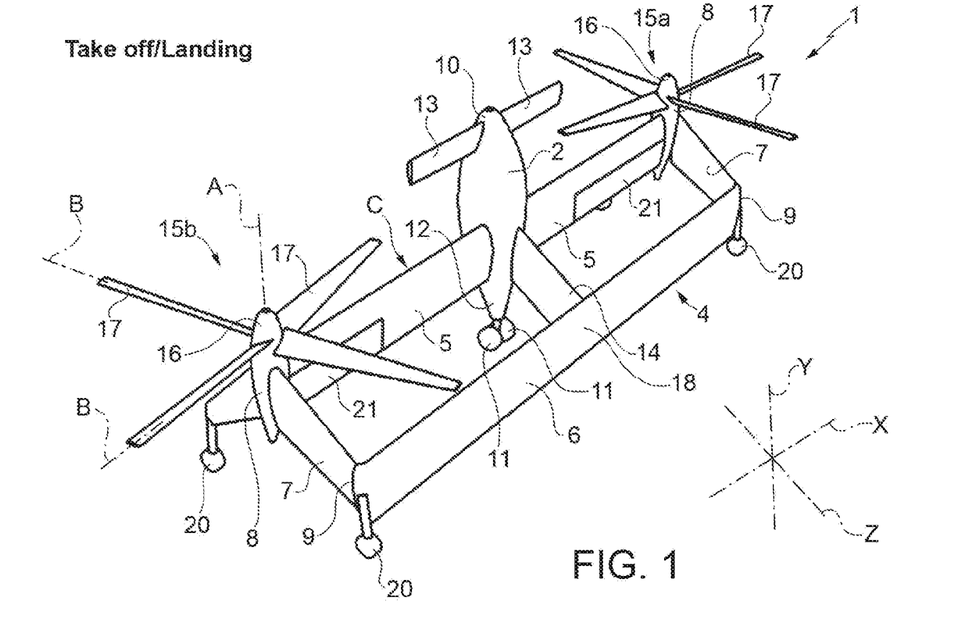
FIG. 1 is a perspective view of an embodiment of the tail sitter shown only for illustrative purposes, in a take-off/landing position.
Figure 2:
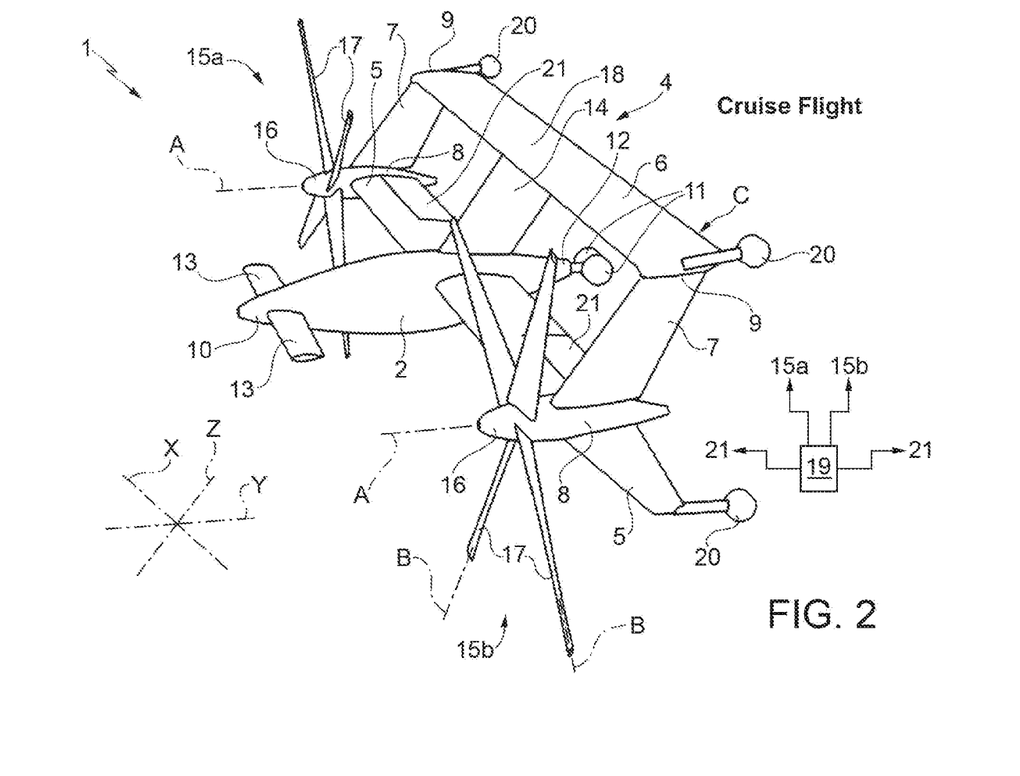
FIG. 2 is a perspective view of the tail sitter in FIG. 1, in a cruising position.

Referring to FIGS. 1 and 2, reference numeral 1 indicates a tail sitter made according to the invention.

The aircraft 1 comprises a fuselage 2.

It is possible to identify a set of three axes integral with the aircraft 1, having an origin at the barycentre of the aircraft 1 and formed by:

an axis Y parallel to the extension direction of the fuselage 2;

an axis X orthogonal to the Y-axis; and an axis Z orthogonal to the X-Y-axes.

The aircraft 1 can assume the cruising position (shown in FIG. 2) in the known manner. In this cruising position, the Y-axis is inclined with respect to the vertical direction. In particular, in the case of constant-height forward flight, the Y-axis is arranged horizontally.

The expression "cruising position" is used in this description to indicate a flight configuration in which the aircraft 1 proceeds with a velocity having at least a horizontal flight component.

Figure 4:
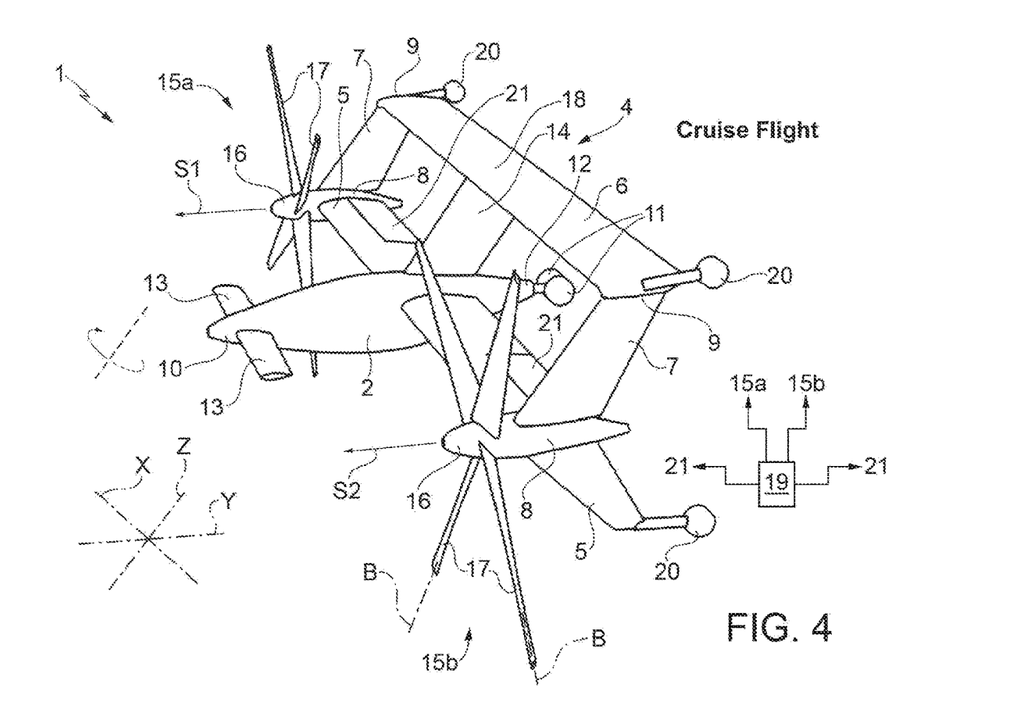
Figure 6:
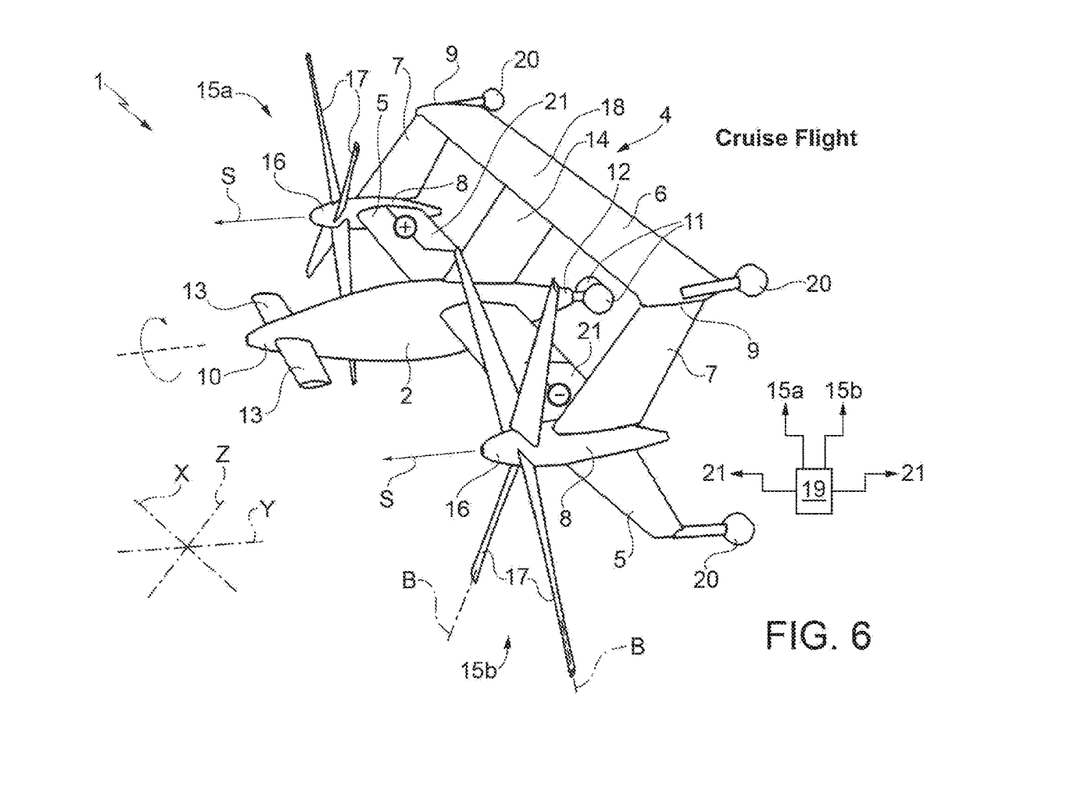
Figure 8:
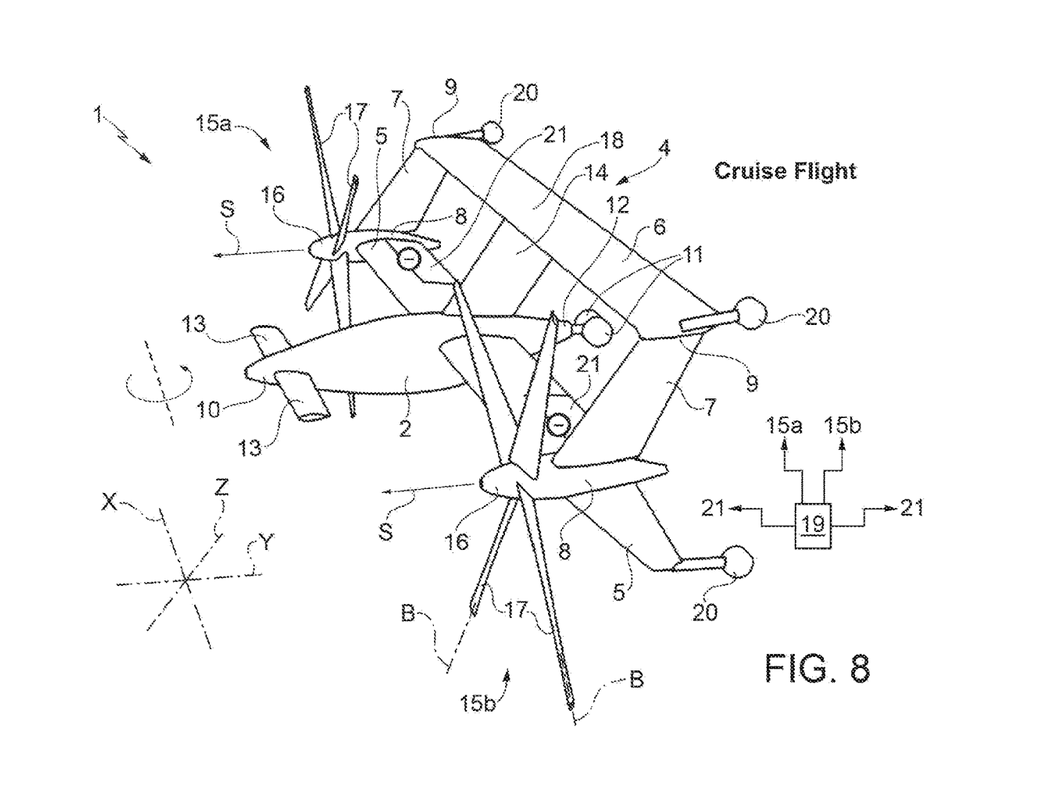

In this cruising position of the aircraft 1, rotations of the aircraft 1 about the X-Y-Z-axes are associated with the following manoeuvres:

roll, namely rotation about the Y-axis (FIG. 6);

pitch, namely rotation about the X-axis (FIG. 8);

yaw, namely rotation about the Z-axis (FIG. 4).

The aircraft 1 can also assume a take-off/landing position, shown in FIG. 1, where the Y-axis is arranged vertically.

Figure 3:
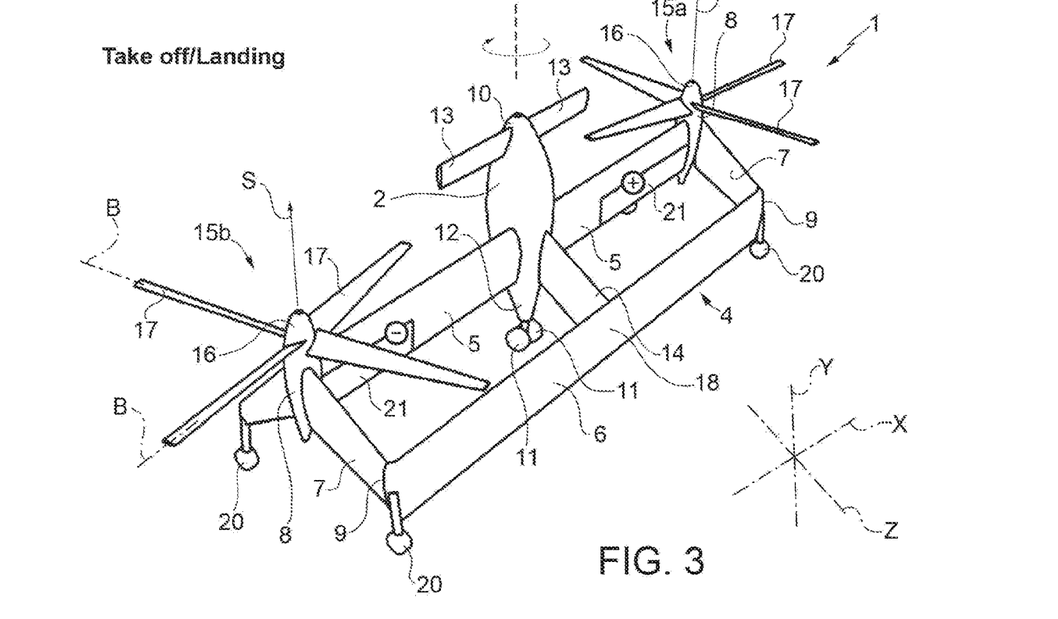
FIGS. 3 and 4 are perspective views of the tail sitter of FIGS. 1 and 2 during the execution of a first manoeuvre and respectively in the take-off/landing position and in the cruising position.
Figure 5:
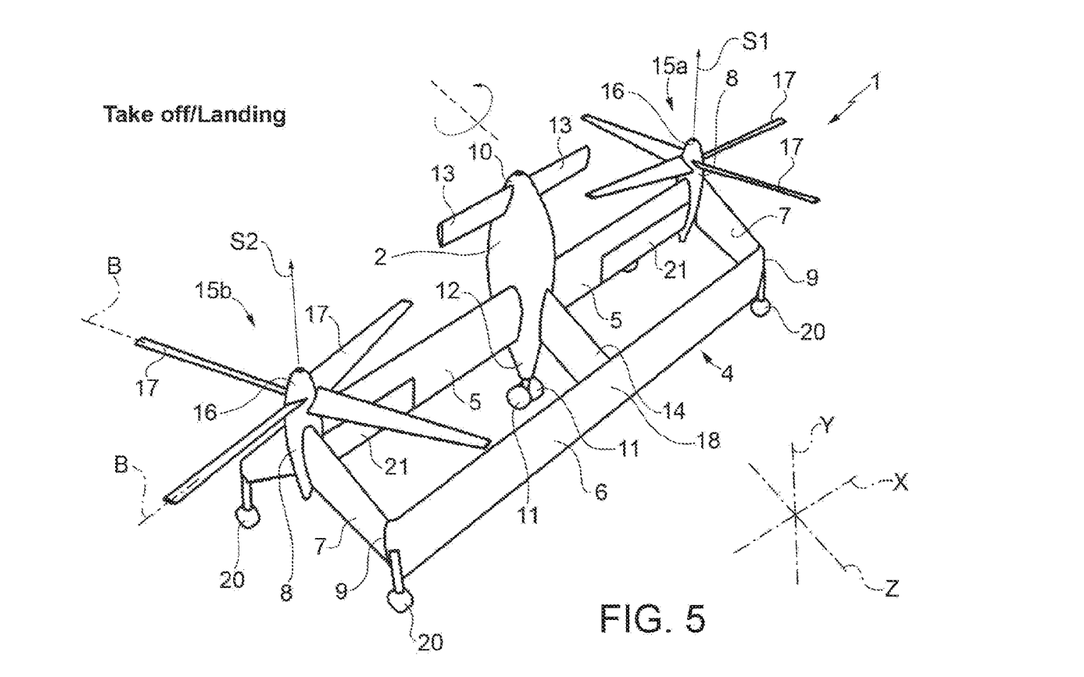
FIGS. 5 and 6 are perspective views of the tail sitter of FIGS. 1 and 2 during the execution of a second manoeuvre and respectively in the take-off/landing position and in the cruising position.

In this take-off/landing position, rotations of the aircraft 1 about the X-Y-Z-axes are associated with following manoeuvres:

roll, namely rotation about the Z-axis (FIG. 5);

pitch, namely rotation about the X-axis (FIG. 7); and yaw, namely rotation about the Y-axis (FIG. 3).

The flight profile of the aircraft 1 provides for a first transition from the take-off position to the cruising position, maintaining the cruising position and a second transition from the cruising position to the landing position.

The aircraft 1 advantageously comprises a wing 4 with a closed front section C, which extends from the fuselage 2.

In this description, the term "wing with a closed front section" means a non-planar wing closed in on itself and without free ends.

The front section C is defined by the projection of the wing 4 on a plane orthogonal to the Y-axis.

In greater detail, the wing 4 basically comprises:

a pair of half-wings 5 projecting in a cantilever fashion from respective mutually opposite sides of the fuselage 2;

a portion 6 arranged above the half-wings 5 in a cruising position of the aircraft 1; and a pair of connecting sections 7, each extending between respective free ends 8 of the half-wings 5 and respective free ends 9 of portion 6.

In the case shown, portion 6 and the half-wings 5 are parallel to each other.

The half-wings 5 and the portion 6 extend along the X-axis.

In the case shown, the overall length of the half-wings 5 along the X-axis is equal to the length of portion 6 along the X-axis.

In the case shown, the half-wings 5 and portion 6 are also straight, with a constant chord, zero wing sweep and zero dihedral angle.

Sections 7 are parallel to each other and extend along the Z-axis, orthogonal to the X-Y-axes.

The aircraft 1 also comprises a further connecting section 14 extending between the fuselage 2 and a median section 18 of portion 6.

In particular, section 14 extends along the direction Z parallel to and centred between sections 7.

In the case shown and with reference to a cruising position of the aircraft 1, portion 6 is arranged above the half-wings 5.

The fuselage 2 also comprises:
- a pair of landing members 11 arranged on a tail 12 of the fuselage 2; and
- a pair of canards 13 arranged near the nose 10, opposite to the tail 12, of the fuselage 2.

The wing 4 also supports:
- a pair of engines 15a and 15b carried by the wing 4; and
- a plurality of landing members 20, which rest on the ground when the aircraft 1 is in the take-off/landing position.

Each engine 15a and 15b comprises, in particular:
- a hub 16 rotating about a respective axis A parallel to the Y-axis and driven in rotation by a drive member that is not shown; and
- a plurality of blades 17 projecting in a cantilever fashion from the hub 16 along respective axes B.

In particular, the blades 17 integrally rotate with the hub 16 about the respective axis A.

The axes A of the hubs 16 of the engines 15a and 15b are incident on the front section C of the wing 4.

In other words, the axes A are arranged along the front section C of the wing 4.

The axes A of the hubs 16 of the engines 15a and 15b are incident on the front section C where the respective half-wings 5 meet respective sections 7.

The axes A of the hubs 16 of the engines 15a and 15b are also arranged on mutually opposite lateral sides of the fuselage 2 with respect to a median plane of the fuselage 2 parallel to the Y-Z-axes and orthogonal to the X-axis.

The cyclic pitch of the blades 17 of each engine 15a and 15b is fixed.

In the case shown, the aircraft 1 comprises a control unit 19 (only schematically shown in FIGS. 2, 4, 6 and 8) programmed to control, independently of one another, the angular velocity of the engines 15a and 15b about their respective rotation axes A and the collective pitch angle of the blades 17 with respect to the airflow.

In this way, the control unit 19 is programmed to control the thrust generated by the respective engines 15a and 15b.

The blades 17 project in a cantilever fashion from the wing 4 on the side towards the nose 10 of the fuselage 2.

In greater detail, the landing members 20 are positioned on the intersection corners between the half-wings 5 and sections 7, and between sections 7 and portion 6.

The landing members 20 protrude from the wing 4 on the side towards the tail 12 of the fuselage 2.

In the case shown, there are four landing members 20.

The half-wings 5 also comprise a plurality of respective ailerons 21, arranged downstream of the respective engines 15a and 15b with reference to a flight condition of the aircraft 1.

The ailerons 21 are thus struck by the airflow generated by the engines 15a and 15b.

Starting from a neutral position shown in FIGS. 4 and 5, the ailerons 21 are controllable by the control unit 19:
- in a symmetric manner, i.e. so as to be tilted in the same direction and by a same angle with respect to the wing 4 (FIGS. 7 and 8); or
- in an antisymmetric manner, i.e. so as to be tilted in opposite directions and by a same angle with respect to the wing 4 (FIGS. 6 and 3).

Referring to FIGS. 3 to 8, the + sign indicates a raising of the ailerons 21 with respect to the associated half-wings 5 and the − sign indicates a lowering of the ailerons 21 with respect to the relative half-wings 5.

The aircraft 1 does not have a tail fin or further movable wing structures other than the wing 4.

In other words, the roll, pitch and yaw movements of the aircraft 1 are exclusively controlled by adjusting the thrust of the engines 15a and 15b and the operation of the ailerons 21.

Alternatively, the roll movement of the aircraft 1 in the cruising position is controlled by movable surfaces of the canards 13.

The aircraft 1 could be a drone provided with opportune equipment on the fuselage 2.

Alternatively, the fuselage 2 could accommodate a crew.

In a further embodiment that is not shown, the aircraft 1 might not comprise the fuselage 2 and be formed by just the wing 4 and, if necessary, by a sensor, for example an antenna or a load, arranged on the wing 4.

Operation of the aircraft 1 is described starting from a take-off condition (FIG. 1) wherein the Y-axis of the fuselage 2 is arranged vertically and the wheels 11 and 20 support the aircraft 1 on the ground.

Operating the engines 15a and 15b causes the aircraft 1 to lift off. In this phase, the engines 15a and 15b counter and overcome the effect of the weight of aircraft 1, enabling lifting off from the ground.

Then, the aircraft 1 performs a first transition, at the end of which it achieves a cruising position (FIG. 2) in which the Y-axis of the fuselage 2 is inclined with respect to the vertical direction and, in the case of constant-height flight, is substantially horizontal.

In this phase, the engines 15a and 15b counter the air resistance and the wing 4 generates the lift necessary to maintain the aircraft 1 in flight.

Later, the aircraft 1 performs a second transition, at the end of which it achieves a landing position entirely similar to the take-off position. In this landing position, the Y-axis of the fuselage 2 is parallel to a vertical direction and the engines 15a and 15b counter the effect of the weight of aircraft 1, enabling a gradual approach to the ground.

The altitude of the aircraft 1 gradually decreases until the landing members 20 rest on the ground, thereby resulting in the completion of the landing manoeuvre.

During the aforementioned flight phases, the aircraft 1 is controlled as follows.

The inclination of the aircraft 1 about the Z-axis is obtained and controlled by holding the ailerons 21 in the neutral position and setting a thrust value S1 on engine 15a and a thrust value S2 on the engine 15b, so as to obtain torque about the Z-axis on the aircraft 1. It is important to note that the thrust values S1 and S2 are different from one another (FIGS. 4 and 5).

The inclination of the aircraft 1 about the Z-axis corresponds to a roll manoeuvre when the aircraft 1 is in the take-off/landing condition (FIG. 5) and a yaw manoeuvre when the aircraft 1 is in the cruising position (FIG. 4).

Figure 7:
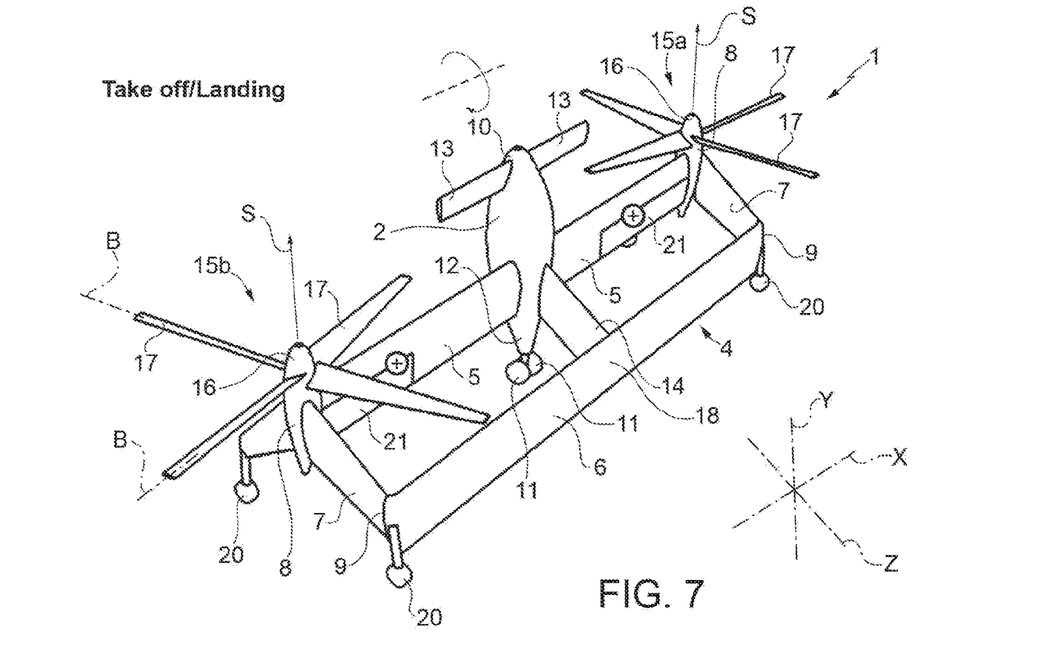
FIGS. 7 and 8 are perspective views of the tail sitter of FIGS. 1 and 2 during the execution of a third manoeuvre and respectively in the take-off/landing position and in the cruising position.

The inclination of the aircraft about the X-axis is obtained and controlled by controlling the ailerons 21 in a symmetric manner—i.e. by tilting them both upwards or downwards—so as to obtain torque about the X-axis on the aircraft 1 (FIGS. 7 and 8). Alternatively, this inclination could be achieved by acting on the movable surfaces carried by the canards 13.

The inclination of the aircraft 1 about the X-axis corresponds to a pitch manoeuvre both when the aircraft 1 is in the take-off/landing condition (FIG. 7) and when the aircraft 1 is in the cruising position (FIG. 8).

The inclination of the aircraft 1 about the Y-axis is obtained and controlled by tilting the ailerons 21 in an antisymmetric manner—i.e. by tilting one upwards and the other downwards—so as to obtain torque about the X-axis on the aircraft 1 (FIGS. 3 and 6).

The inclination of the aircraft 1 about the Y-axis corresponds to a yaw manoeuvre when the aircraft 1 is in the take-off/landing condition (FIG. 3) and a roll manoeuvre when the aircraft 1 is in the cruising condition (FIG. 6).

Figure 9:
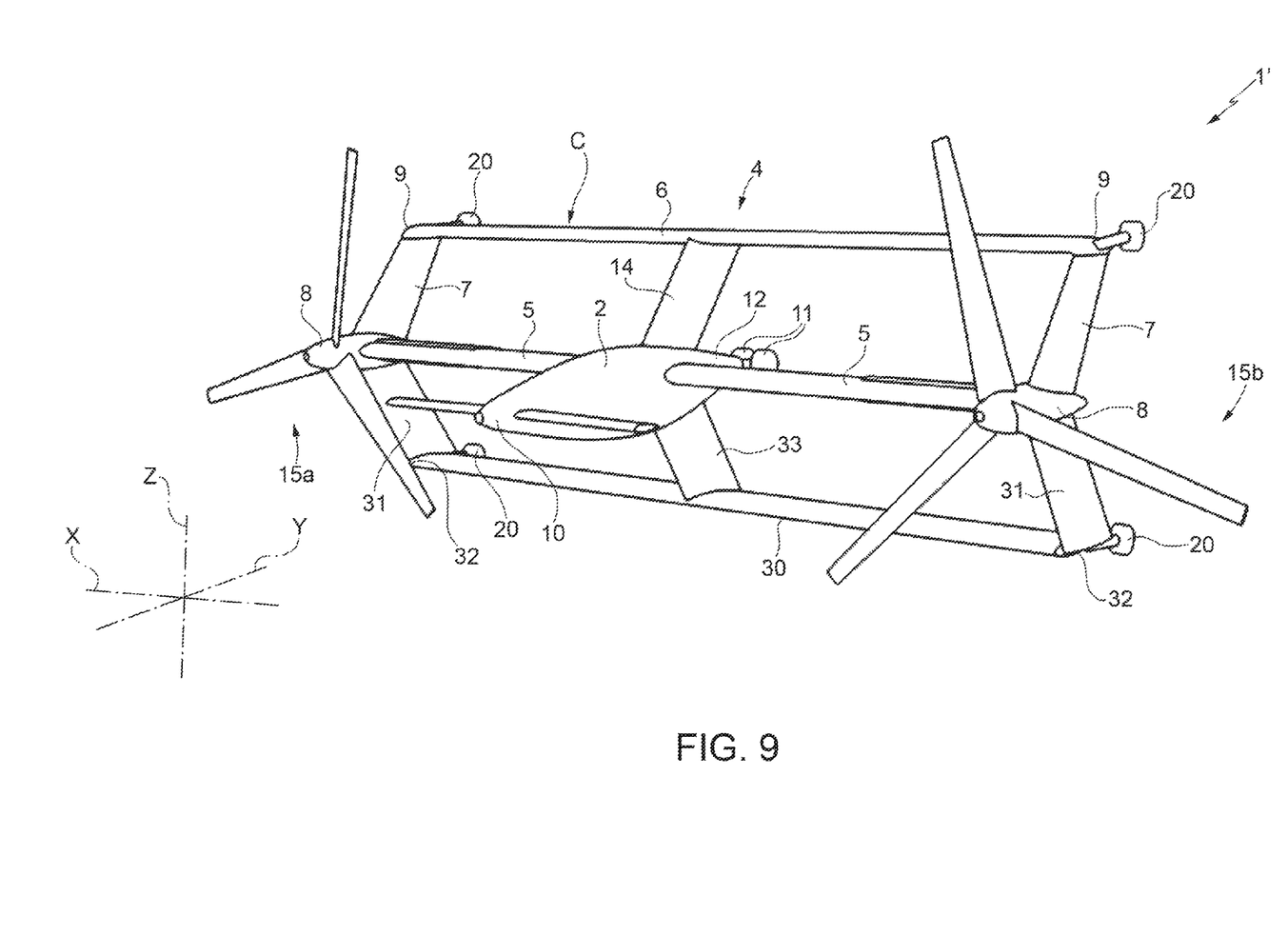
FIG. 9 is a perspective view of a first embodiment of the tail sitter shown made according to the principles of the present invention, in a cruising position.

Referring to FIG. 9, reference numeral 1' indicates a tail sitter according to a first embodiment of the present invention.

Aircraft 1' is similar to aircraft 1 and will be described hereinafter only with regard to the differences; where possible, identical and corresponding parts of aircraft 1' and aircraft 1 will be indicated with the same reference numerals.

In particular, aircraft 1' differs from aircraft 1 in that the wing 4 comprises a further portion 30, arranged below the half-wings 5 with reference to a cruising position of aircraft 1.

Portion 30 and the half-wings 5 are connected by first sections 31 at respective free ends 32 and 8. In addition, a centre section of portion 30 is connected to the fuselage 2 by a section 33 interposed between sections 31 along the X-axis. Sections 31 and 33 extend parallel to the Z-axis.

Portion 30 is provided with further landing members 20.

The operation of aircraft 1' is similar to that of aircraft 1 and is therefore not described in detail.

Figure 10:
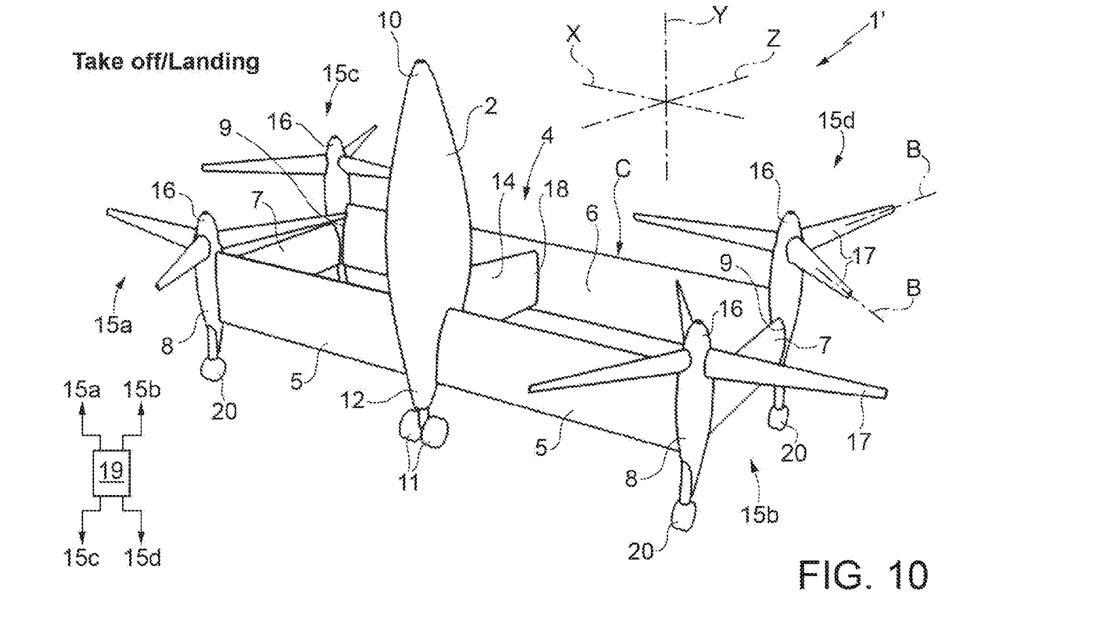
FIG. 10 is a perspective view of a further embodiment of the tail sitter shown only for illustrative purposes, in a take-off/landing position.
Figure 11:
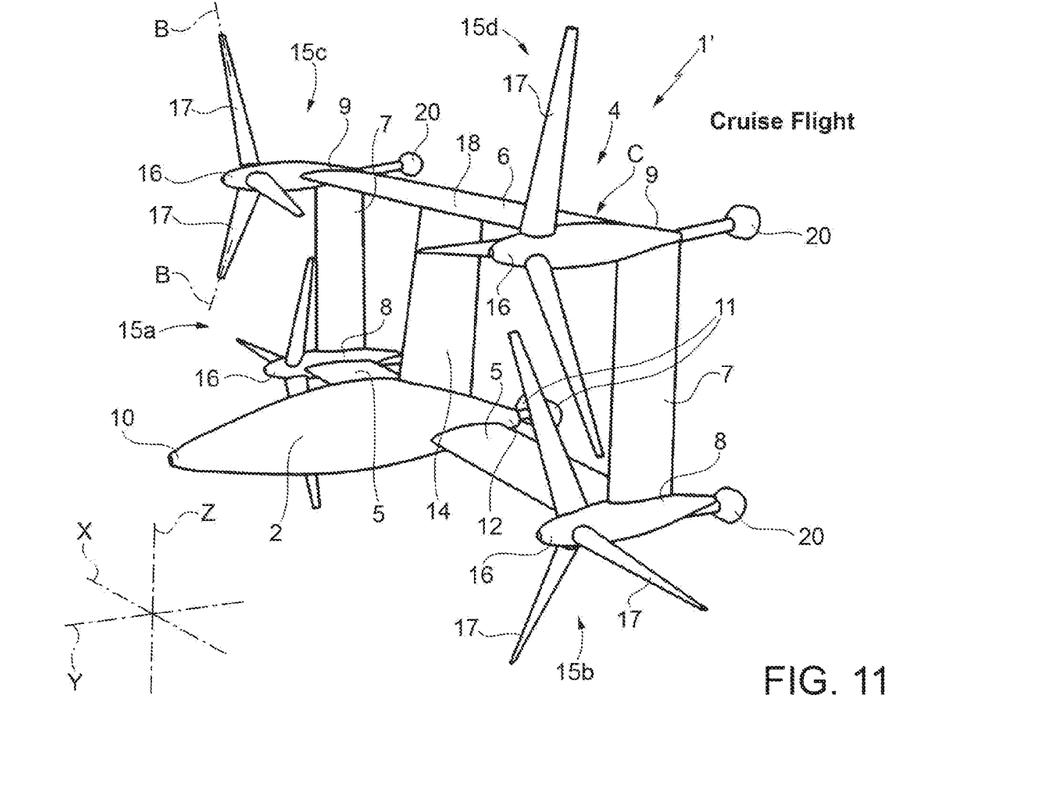
FIG. 11 is a perspective view of the tail sitter in FIG. 10, in a cruising position.

Referring to FIGS. 10 and 11, reference numeral 1" indicates a tail sitter according to a further embodiment.

Aircraft 1" is similar to aircraft 1 and will be described hereinafter only with regard to the differences; where possible, identical and corresponding parts of aircraft 1" and 1 will be indicated with the same reference numerals.

In particular, aircraft 1" differs from aircraft 1 in that it:
comprises four engines 15a, 15b, 15c and 15d arranged on the intersecting corners between the half-wings 5 and sections 7, and between sections 7 and portion 6;
does not comprise the ailerons 21; and
does not comprise the canards 13.

In particular, the axes A of the hubs 16 of the engines 15a, 15b, 15c and 15d are incident on the front section C of the wing 4, on the intersecting corners between the half-wings 5 and sections 7, and between sections 7 and portion 6.

In other words, the axes A are arranged along the front section C of the wing 4.

The axes A of the hubs 16 of engines 15a and 15b are incident on the front section C at respective ends 8 of the half-wings 5.

The axes A of the hubs 16 of engines 15c and 15d are incident on the front section C on portion 6 at the end 9 of the wing 4.

In particular, the axes A of the hubs 16 of engines 15a and 15b are arranged on the intersecting corners between the half-wings 5 and sections 7, i.e. on the ends 8 of the respective half-wings 5.

The axes A of the hubs 16 of engines 15c and 15d are arranged on the intersecting corners between sections 7 and portion 6, i.e. on the ends 9 of portion 6.

The axes A of the hubs 16 of engines 15a and 15b (15c and 15d) are arranged on respective mutually opposite lateral sides with reference to a plane passing through the fuselage 2 and parallel to the X-Z-axes and orthogonal to the Y-axis.

Engine 15c is arranged above engine 15a and engine 15d is arranged above engine 15b, with reference to a cruising condition of the aircraft 1 (FIG. 11).

The hubs 16 of the engines 15a, 15b, 15c and 15d rotate about their respective axes A in different rotation directions from one another.

In particular, engines 15a and 15d can rotate in a first rotation direction, for example clockwise (anticlockwise). Engines 15b and 15c can rotate in a second rotation direction, for example anticlockwise (clockwise).

Figure 15:
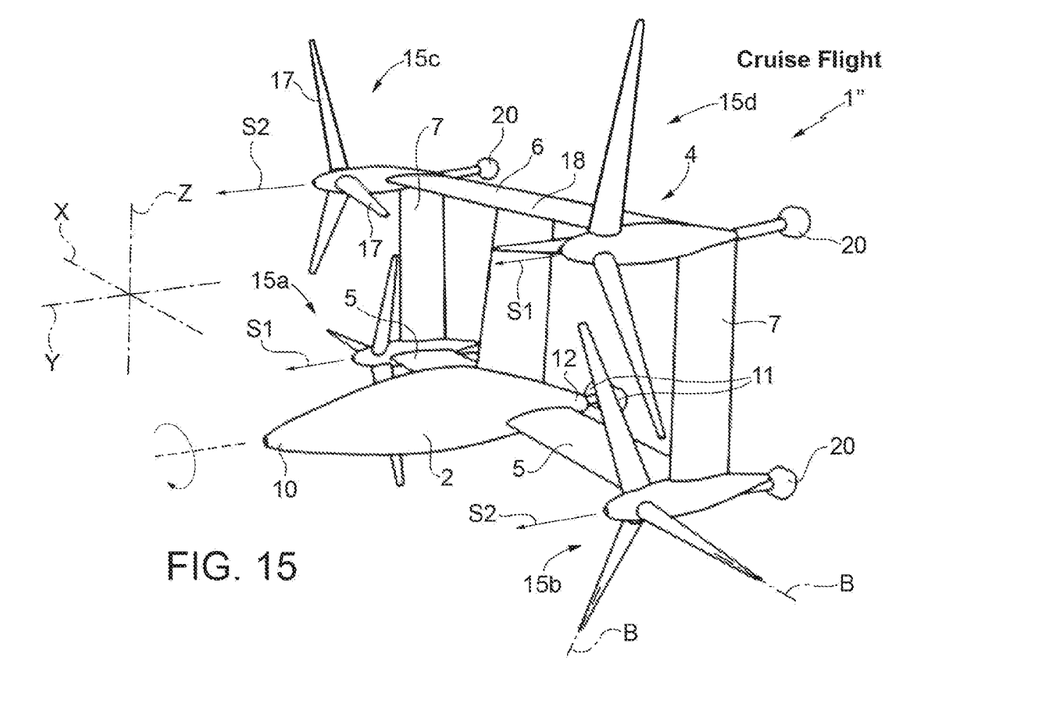
Figure 16:
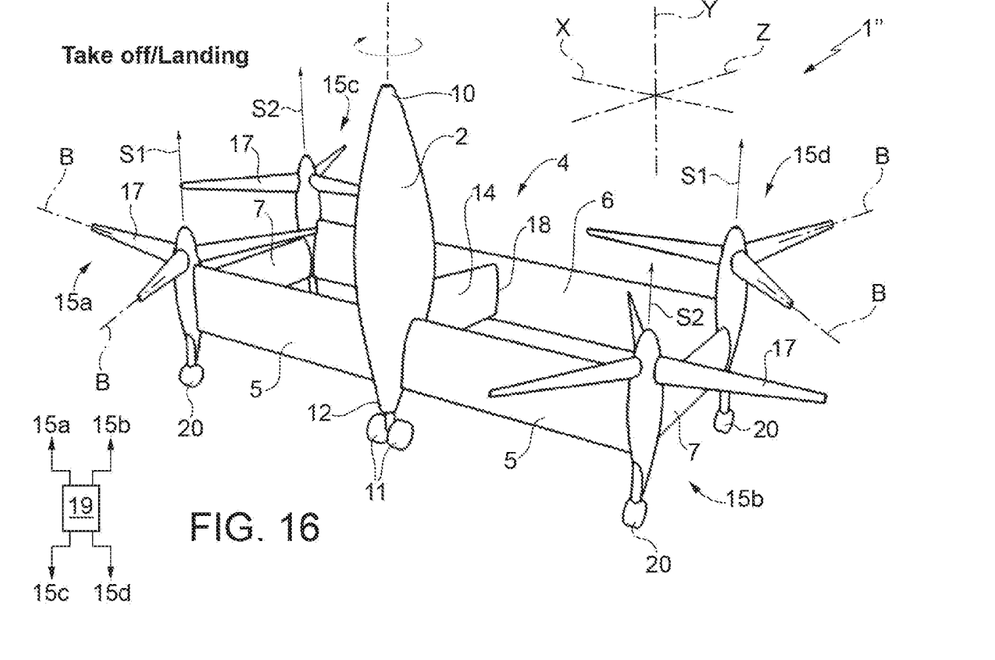
FIGS. 16 and 17 are a perspective views of the tail sitter of FIGS. 10 and 11 during the execution of a third manoeuvre and respectively in the take-off/landing position and in the cruising position.

The operation of tail sitter 1" differs from that of tail sitter 1 in that the inclination about the Y-axis is obtained and controlled by setting first thrust values S1 on engines 15a and 15d and second thrust values S2 different from S1 on engines 15b and 15c, so as to obtain torque parallel to the Y-axis acting on the aircraft 1" (FIGS. 15 and 16).

It is important to note that when the thrust S1 of rotors 15a and 15d increases, the thrust S2 of engines 15b and 15c decreases by the same value. In this way, the resulting overall thrust on the aircraft 1" does not change, while torque is generated about the Y-axis that causes rotation of the aircraft 1" about the Y-axis.

Figure 14:
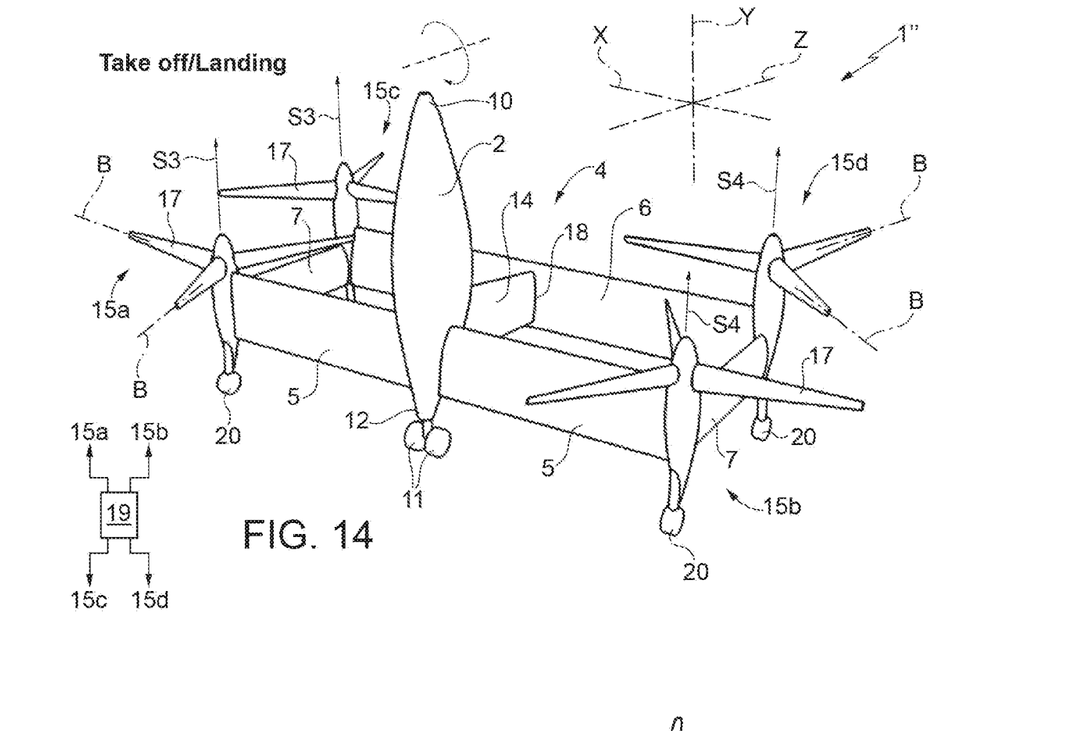
FIGS. 14 and 15 are a perspective views of the tail sitter of FIGS. 10 and 11 during the execution of a second manoeuvre and respectively in the take-off/landing position and in the cruising position.
Figure 17:
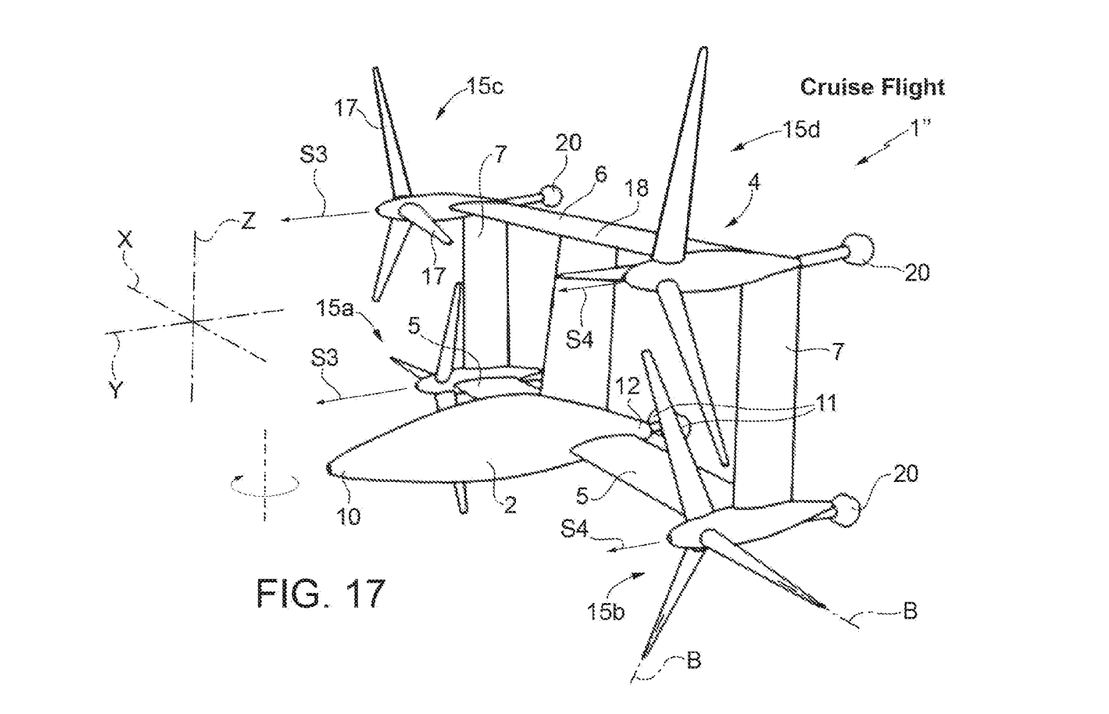

Furthermore, the inclination about the Z-axis is obtained and controlled by setting first thrust values S3 on engines 15a and 15c and second thrust values S4 different from S3 on engines 15b and 15d, so as to obtain torque parallel to the Z-axis acting on the aircraft 1" (FIGS. 14 and 17).

Figure 12:
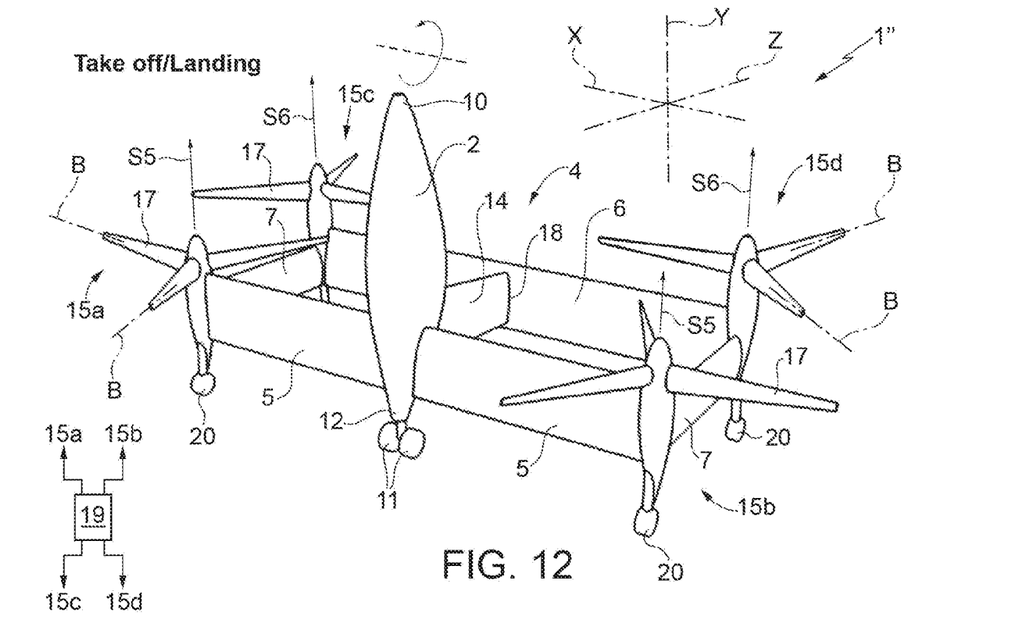
FIGS. 12 and 13 are a perspective views of the tail sitter of FIGS. 10 and 11 during the execution of a first manoeuvre and respectively in the take-off/landing position and in the cruising position.
Figure 13:
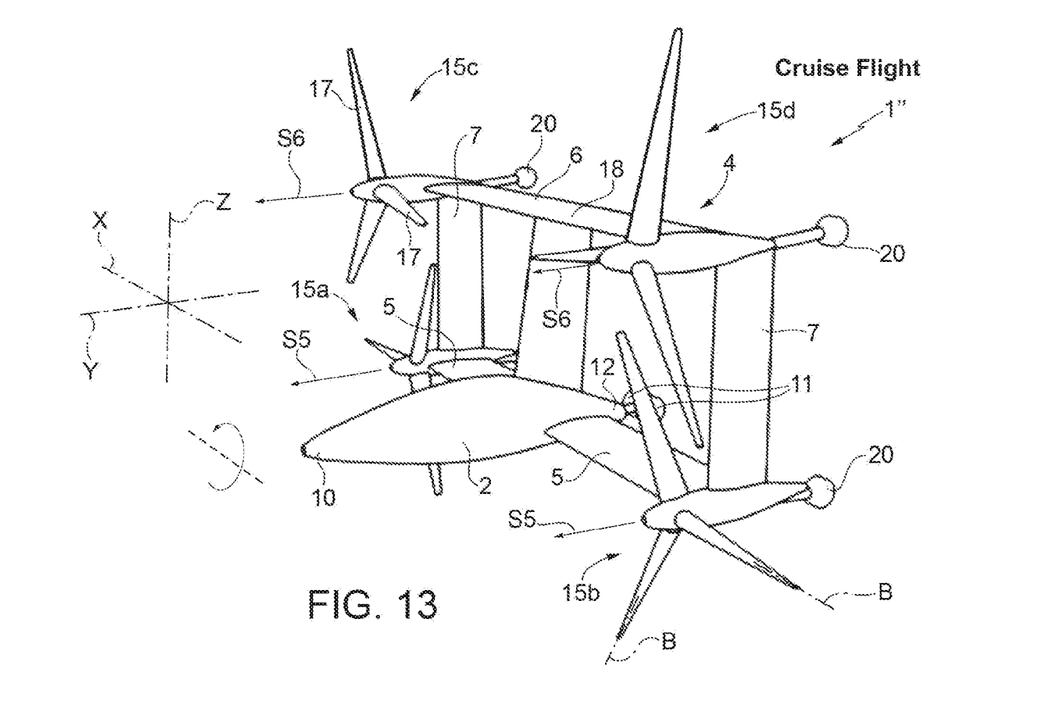

The inclination of the aircraft 1" about the X-axis is obtained and controlled by setting first thrust values S5 on engines 15a and 15b and second thrust values S6 different from S5 on engines 15b and 15c, so as to obtain torque parallel to the X-axis acting on the aircraft 1" (FIGS. 12 and 13).

Figure 18:
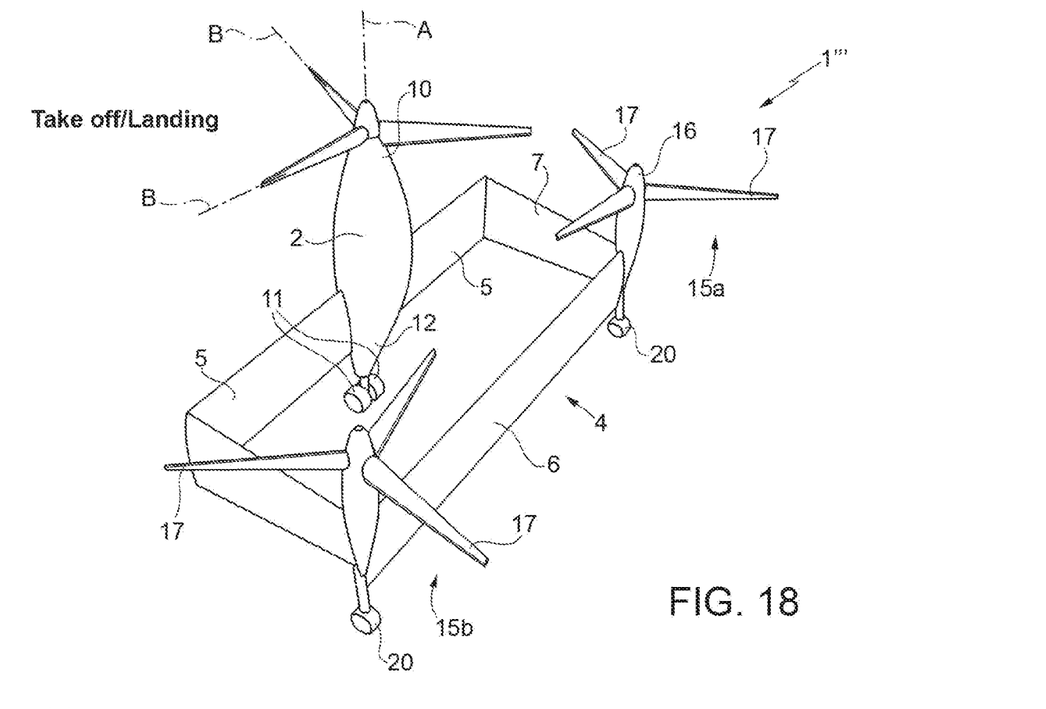
FIGS. 18 and 19 are a perspective views of further embodiments of the tail sitter shown only for illustrative purposes, respectively in a take-off/landing position and in a cruising position.
Figure 19:
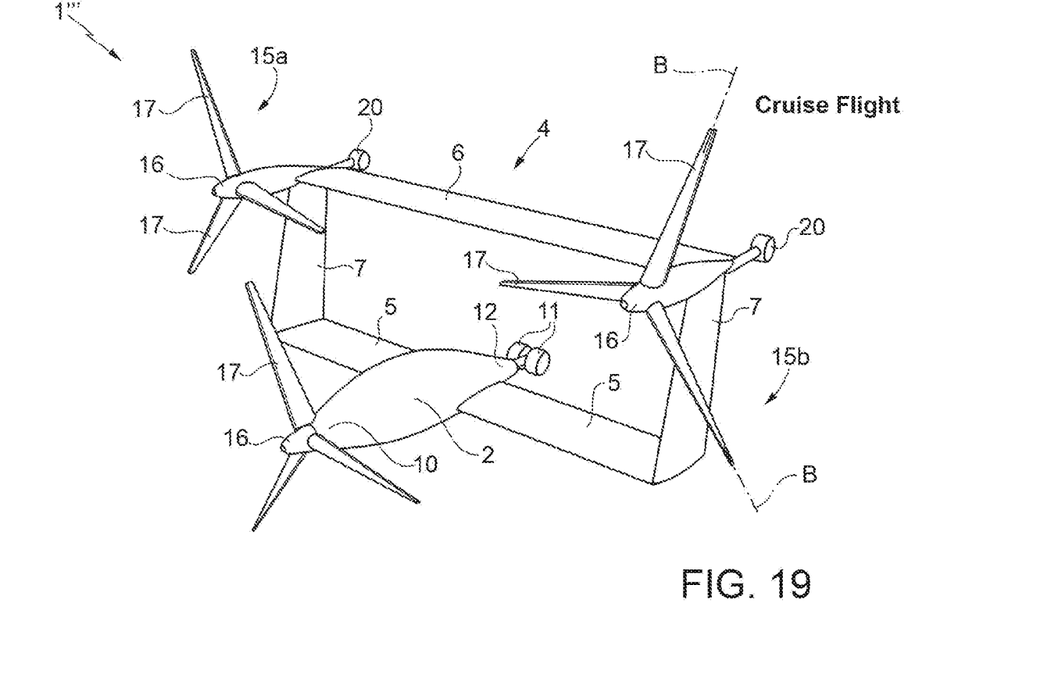

Referring to FIGS. 18 and 19, reference numeral 1''' indicates a tail sitter according to a further embodiment.

Aircraft 1''' is similar aircraft 1" and will be described hereinafter only with regard to the differences; where possible, identical and corresponding parts of aircraft 1''' and aircraft 1" will be indicated with the same reference numerals.

In particular, aircraft 1''' differs from aircraft 1" in that it:
comprises two engines 15a and 15b arranged on the intersecting corners between sections 7 and portion 6; and
comprises a further engine 15" arranged on the nose 10 of the fuselage 2.

Figure 20:
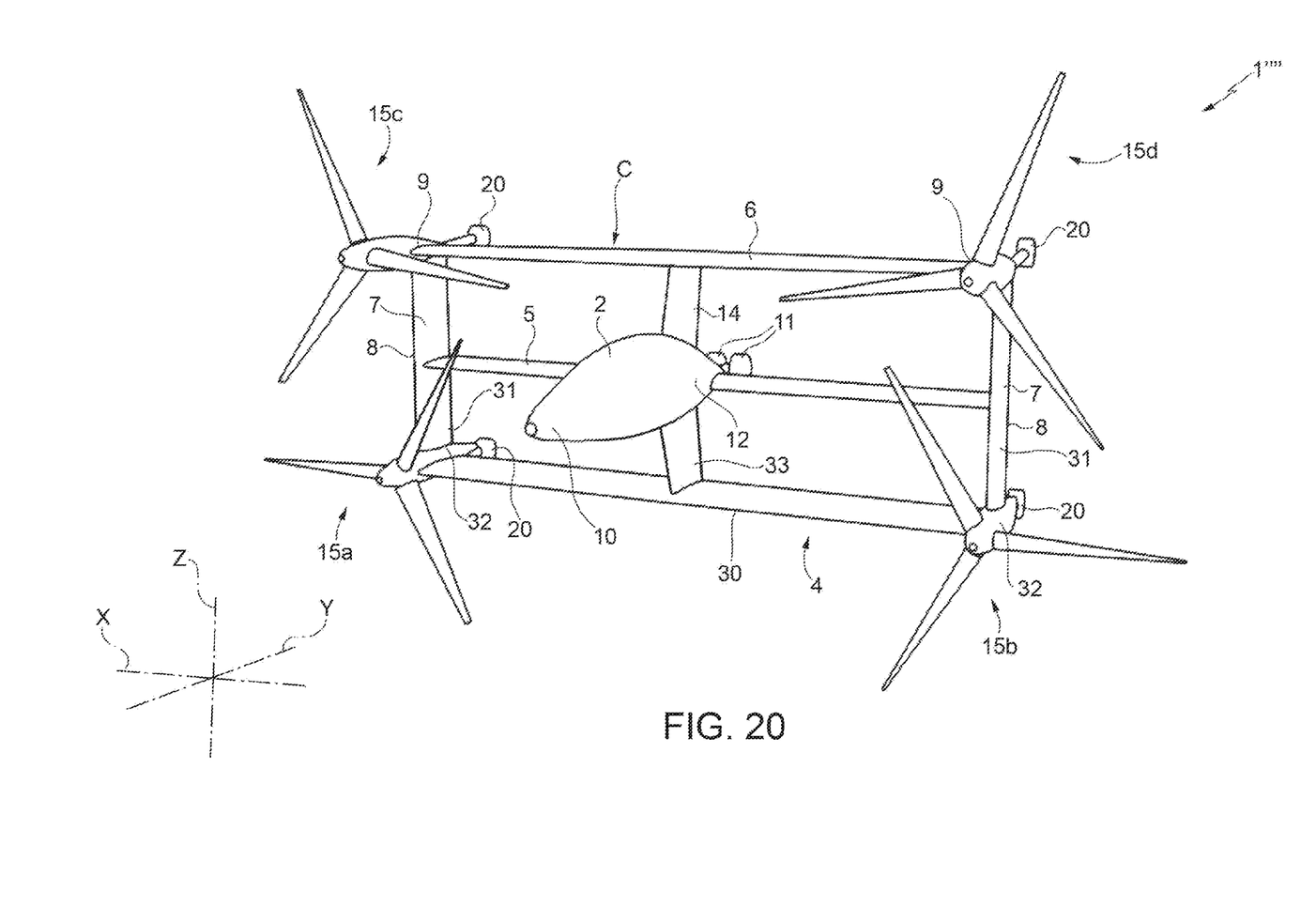
FIG. 20 is a perspective view of a second embodiment of the tail sitter made according to the principles of the present invention.

Referring to FIG. 20 reference numeral 1'''' indicates a tail sitter according to an embodiment of the present invention.

Aircraft 1'''' is similar to aircraft 1" and will be described hereinafter only with regard to the differences;
where possible, identical and corresponding parts of aircraft 1'''' and 1" will be indicated with the same reference numerals.

In particular, aircraft 1"" differs from aircraft 1" in that the wing 4 comprises a further portion 30, arranged below the half-wings 5 with reference to a cruising position of the aircraft 1.

Portion 30 and the half-wings 5 are connected by first sections 31 at respective free ends 32 and 8. In addition, a centre section of the portion 30 is connected to the fuselage 2 by a section 33 interposed between sections 31 along the X-axis. Sections 31 and 33 extend parallel to the Z-axis.

Portion 30 is provided with further wheels 20.

The operation of aircraft 1"" is similar to that of aircraft 1" and is therefore not described in detail.

From examination of the characteristics of the tail sitter 1', 1"" according to the present invention, the advantages that can obtained therewith are evident.

In particular, the wing 4 has a closed front section C.

This means that it is possible to not only increase the efficiency of the aircraft 1', 1"" in the cruising position, but also obtain the following advantages deriving exclusively from its application to the tail sitter 1', 1"":
- minimizing the surface exposed to the wind when the aircraft 1', 1" " is in the take-off/landing position, thereby minimizing sensitivity to gusts of wind during the take-off/landing phases; and
- satisfying the geometric constraints due to the necessity of having a wing 4 of limited size parallel to the X-axis in the take-off/landing phases.

In addition, the aircraft 1', 1"" does not require the presence of tail fins to ensure longitudinal stability. Actually, aircraft 1"" does not even require the presence of canards 13 or ailerons 21 used in a symmetric manner, enabling longitudinal stability to be assured by the relative positioning and wing profiles of the half-wings 5 and portion 6. This enables a further reduction in the complexity and weight of the aircraft 1', 1"".

With reference to aircraft 1', the ailerons 21 are arranged immediately downstream of the engines 15a and 15b. In this way, when the aircraft 1' is in the cruising position, the ailerons 21 are struck by the backwash of the respective engines 15a and 15b.

Due to this, it is possible to control the rotation of aircraft 1' about the X-Y-Z-axes by simply controlling the thrust S1 and S2 of the engines 15a and 15b in a differential manner and/or by rotating the ailerons 21 in the same or opposite directions with respect to the wing 4.

This results in further simplification and weight reduction of aircraft 1'.

With reference to aircraft 1"", control of rotation about the X-Y-Z-axes in the cruising position and the take-off/landing position is achieved by simply controlling the thrust S1, S2, S3, S4, S5, S6 of the engines 15a, 15b, 15c and 15d in a differential manner.

Thus, aircraft 1" " is even less complex than aircraft 1.

The engines 15a and 15b, the landing members 20 and the ailerons 21 are carried by the wing 4. This means that in the case where the aircraft 1', 1"" is unmanned, it is possible to reduce the fuselage 2 to a minimum, or even eliminate it, obtaining a particularly light aircraft 1', 1"" of reduced complexity.

Finally, in the case where the aircraft 1', 1"" is unmanned, it might not even comprise the fuselage 2. In these circumstances, the aircraft 1', 1"" would be formed substantially by the wing 4 and by any equipment, for example an antenna or a sensor mounted on-board the wing 4.

The engines 15a, 15b, 15c and 15d of aircraft 1"" are all carried by the wing 4. In consequence, the fuselage 2 is not directly impacted by the vibrations generated by further engines mounted directly thereon.

In the case where the fuselage 2 accommodates a crew, this allows raising crew comfort. Contrariwise, in the case where the fuselage 2 only houses sensors or equipment, this allows making the position of the sensors and equipment more stable over time.

As a result of what has been indicated in the foregoing, the aircraft 1', 1"" enables combining the constructional simplicity of tail sitters—which do not require the rotation of engines or rotors to perform the transition between the take-off/landing position and the cruising position—with achieving cruising speeds and performance comparable with those of aeroplanes.

In other words, the aircraft 1', 1"" enables making the tail sitter design solution usable, overcoming the numerous drawbacks that have prevented its development.

This is even more advantageous if the aircraft 1', 1"", is unmanned. In fact, in these circumstances, the aircraft 1', 1" " does not even have the inevitable drawback of tail sitters requiring particularly uncomfortable crew positions during take-off/landing manoeuvres.

Finally, it is clear that modifications and variants can be made regarding the tail sitter 1', 1"" described and illustrated herein without departing from the scope defined in the appended claims.

In particular, the wing 4 could be shaped like a ring, diamond or polygon.

The invention claimed is:

1. A tail sitter aircraft (1', 1"") comprising: a wing (4) with a closed front section (C);
    a fuselage (2), from which said wing (4) extends; said fuselage (2) extending parallel to a first axis (Y);
    said wing (4) being a non-planar wing closed in on itself and without free ends; said front section (C) being defined by the projection of said wing (4) on a plane orthogonal to said first axis (Y);
    said wing (4) comprising:
        a first portion (5) projecting from said fuselage (2);
        a second portion (6) spaced from said first portion (5); and
        a first and a second connecting section (7), which are interposed between respective ends (8, 9) of said first portion (5) and of said second portion (6);
    said first portion (5) and said second portion (6) being parallel to one another and extending parallel to a second axis (X) orthogonal to said first axis (Y);
    said first axis (Y) being arranged, in use, vertically in a take-off/landing position and inclined with respect to the vertical direction in a cruising position;
    characterized in that said first and a second connecting section (7) extend parallel to a third axis (Z) orthogonal to said second axis (X) and to said first axis (Y);
    said wing (4) with a closed front section (C) comprising a third portion (30) arranged on the opposite side of said first portion (5) with respect to said second portion (6) and connected to said first portion (5) at their respective ends (32, 8) by first sections (31) extending parallel to said third axis (Z);
    wherein a centre section of said third portion (30) is connected to said fuselage (2) by second sections (33) interposed between first sections (31) along said second axis (X).

2. The aircraft of claim 1, characterized in that said third portion (30) is provided with landing members (20).

3. The aircraft of claim 1, wherein second sections (33) extend parallel to said third axis (Z).

4. The aircraft according to claim 1, comprises further comprising a third connecting section (14), which is interposed between said fuselage (2) and said second portion (6).

5. The aircraft according to claim 1, wherein said second portion (6) is arranged above said first portion (5), with reference to a horizontal translational flight condition of said aircraft (1'''') and a constant height forward flight in which said first axis (Y) parallel to the extension direction of said fuselage (2) is arranged, in use, horizontally.

6. The aircraft according to claim 1, further comprising one or more further landing members (20) carried by said wing (4) and adapted to rest on the ground before take-off and after landing of the aircraft (1'''').

7. The aircraft according to claim 6, wherein at least one first further landing member (20) is carried by said first portion (5) of said wing (4), and at least one second further landing member (20) is carried by said second portion (6) of said wing (4).

8. The aircraft according to claim 1, further comprising at least a first and a second drive member (15a, 15b; 15a, 15b, 15c, 15d) carried by said wing (4).

9. The aircraft according to claim 8, wherein said first and second drive members (15a, 15b; 15a, 15b, 15c, 15d) are arranged on respective ends (8, 9) of one of said first portion (5) and second portion (6).

10. The aircraft according to claim 9, further comprising a first and a second aileron (21) arranged downstream of the respective said first and second drive members (15a, 15b), with reference to a translational flight condition of said aircraft;

said first and second ailerons (21) being arranged in a position so that they are respectively struck, in use, by a first and a second airflow generated by the respective first and second drive members (15a, 15b);

said first and second ailerons (21) being tiltable with respect to said wing (4) in the same direction or in mutually opposite directions.

11. The aircraft according to claim 8, wherein each said first and second drive member (15a, 15b; 15a, 15b, 15c, 15d) comprises:

a hub (16) rotating about a respective fourth axis (A); and a plurality of blades (17) integrally rotating with said hub (16) about the respective fifth axis (B) and hinged on said hub (16) so that it is possible to selectively adjust the respective pitch angles to the same value;

the angular velocity of said hub (16) and the respective pitch angles of said blades (17) being adjustable independently of one another.

12. The aircraft according to claim 10, wherein the aircraft is a drone or in that said fuselage (2) is configured to accommodate a crew.

13. The aircraft according to claim 1, wherein the aircraft is without a tail fin.

* * * * *